US011455396B2

(12) United States Patent  
Shivanna et al.

(10) Patent No.: US 11,455,396 B2  
(45) Date of Patent: Sep. 27, 2022

(54) USING TRUSTED PLATFORM MODULE (TPM) EMULATOR ENGINES TO MEASURE FIRMWARE IMAGES

(71) Applicant: Hewlett Packard Enterprise Development LP, Houston, TX (US)

(72) Inventors: Suhas Shivanna, Bangalore (IN); Shiva R. Dasari, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 469 days.

(21) Appl. No.: 15/593,546

(22) Filed: May 12, 2017

(65) Prior Publication Data

US 2018/0330093 A1 Nov. 15, 2018

(51) Int. Cl.
*G06F 9/00* (2006.01)
*G06F 15/177* (2006.01)
*G06F 21/57* (2013.01)
*G06F 9/4401* (2018.01)
*H04L 9/32* (2006.01)
*H04L 9/08* (2006.01)
*G06F 8/61* (2018.01)

(52) U.S. Cl.
CPC .......... *G06F 21/575* (2013.01); *G06F 9/4401* (2013.01); *H04L 9/0897* (2013.01); *H04L 9/3234* (2013.01); *G06F 8/63* (2013.01); *G06F 2221/2141* (2013.01)

(58) Field of Classification Search
CPC .......... G06F 21/575; G06F 2221/2141; G06F 9/4401; H04L 9/3234
See application file for complete search history.

(56) References Cited

U.S. PATENT DOCUMENTS

| 8,006,100 B2 | 8/2011 | King et al. |
| 8,874,916 B2 | 10/2014 | Smith et al. |
| 9,135,436 B2 | 9/2015 | Lee |
| 2005/0021968 A1* | 1/2005 | Zimmer ................ G06F 21/572 713/176 |

(Continued)

OTHER PUBLICATIONS

NPL_Wikipedia, the free encyclopedia, "Trusted Execution Technology" May 24, 2015, pp. 1-3 (Year: 2015).*

(Continued)

*Primary Examiner* — Nitin C Patel  
(74) *Attorney, Agent, or Firm* — Hewlett Packard Enterprise Patent Department (57) ABSTRACT

Examples disclosed herein relate to performing an action based on a pre-boot measurement of a firmware image. In an example, at a firmware component in a system, a measurement of a firmware image may be determined prior to booting of the system, beginning from a hardware root of trust boot block, by a Trusted Platform Module (TPM) emulator engine that emulates a hardware-based TPM. A pre-determined measurement of the firmware image may be retrieved from a storage location within the system. The measurement of the firmware image may be compared with the pre-determined measurement of the firmware image prior to booting of the system. In response to a determination that the measurement of the firmware image is different from the pre-determined measurement of the firmware image, performing an action.

18 Claims, 4 Drawing Sheets

(56) References Cited

U.S. PATENT DOCUMENTS

| | | | |
|---|---|---|---|
| 2005/0210467 A1* | 9/2005 | Zimmer | G06F 21/53 718/1 |
| 2007/0016766 A1* | 1/2007 | Richmond | G06F 21/53 713/100 |
| 2009/0150899 A1* | 6/2009 | Tahan | G06F 21/57 718/106 |
| 2009/0169017 A1* | 7/2009 | Smith | G06F 21/57 380/278 |
| 2009/0222653 A1* | 9/2009 | Findeisen | G06F 21/575 713/2 |
| 2009/0276617 A1* | 11/2009 | Grell | G06F 21/575 713/2 |
| 2015/0264021 A1* | 9/2015 | Schulz | H04L 63/0414 713/170 |
| 2016/0119336 A1 | 4/2016 | Dyer et al. | |
| 2016/0147996 A1* | 5/2016 | Martinez | G06F 21/572 713/2 |
| 2016/0350536 A1* | 12/2016 | Grimes | G06F 21/575 |
| 2017/0010875 A1* | 1/2017 | Martinez | G06F 8/61 |
| 2017/0109817 A1 | 4/2017 | Vea et al. | |
| 2017/0364685 A1 | 12/2017 | Shah et al. | |

OTHER PUBLICATIONS

Du, Z. et al., Trusted Firmware Services Based on TPM, (Research Paper), 2009, 9 Pgs.

TCG PC Client Platform Firmware Profile, Specification, (Research Paper), Jan. 13, 2017, 116 Pgs.

vSphere Security, (Research Paper), 2014, 194 Pgs.

Intel, "Intel Cloud Integrity Technology Product Guide", Revision 2.0, Apr. 2015, 65 pages.

Jill Caugherty, "IBM x86 Servers—System x, Flex System & BladeCenter", available online at <https://web.archive.org/web/20150323051951/https://www-304.ibm.com/connections/blogs/ibmx86/entry/trusted_platform_assurance?ang=en_us>, Sep. 26, 2014, 3 pages.

* cited by examiner

USING TRUSTED PLATFORM MODULE (TPM) EMULATOR ENGINES TO MEASURE FIRMWARE IMAGES

BACKGROUND

Trusted Computing involves verifying that one computer is trustable to another. With Trusted Computing, a computer may consistently behave in expected ways, and those behaviors may be enforced by computer hardware, software, and/or firmware. In an example, Trusted Computing may be achieved by loading the hardware with a unique encryption key inaccessible to the rest of the system.

BRIEF DESCRIPTION OF THE DRAWINGS

For a better understanding of the solution, embodiments will now be described, purely by way of example, with reference to the accompanying drawings, in which.

DETAILED DESCRIPTION

A computing system may be vulnerable to various security-related concerns such as viruses, malware, spyware, Trojan worms, phishing scams, key-stroke loggers, etc. Specifically, there is an increasing evidence of security attacks targeting firmware components. Considering these challenges, it may be desirable to build a secure firmware platform which is trustable by another computer system. Within large scale cloud and enterprise deployments, there is an increased importance given to firmware attestation with the aim to establish trust on the version of the firmware and to ensure that the software application and services are deployed on trusted systems.

Some approaches to firmware attestation include installation of an agent on the operating system (OS). These approaches may be performed after loading of the operating system, and do not address attestation of a firmware before a system has been booted. These approaches do not provide an out-of-band attestation of a firmware image of a firmware component (for example, an I/O card).

To address these technical challenges, the present disclosure describes various examples for performing an action based on a pre-boot measurement of a firmware image. In an example, at a firmware component in a system, a measurement of a firmware image may be determined prior to booting of the system. In an example, the measurement may be performed, beginning from a hardware root of trust boot block, by a Trusted Platform Module (TPM) emulator engine that emulates a hardware-based TPM. A pre-determined measurement of authentic firmware images may be retrieved from a storage location within the system. The measurement of the firmware image may be compared with the pre-determined measurement of the firmware image prior to booting of the system. In response to a determination that the measurement of the firmware image is different from the pre-determined measurement of the firmware image, an action may be performed. In an example, the action may relate to the firmware image, the firmware component, and/or the system. The present disclosure proposes an out-of-band and an agentless firmware attestation solution that allows measurement of various firmware components before system boot.

Figure 1:
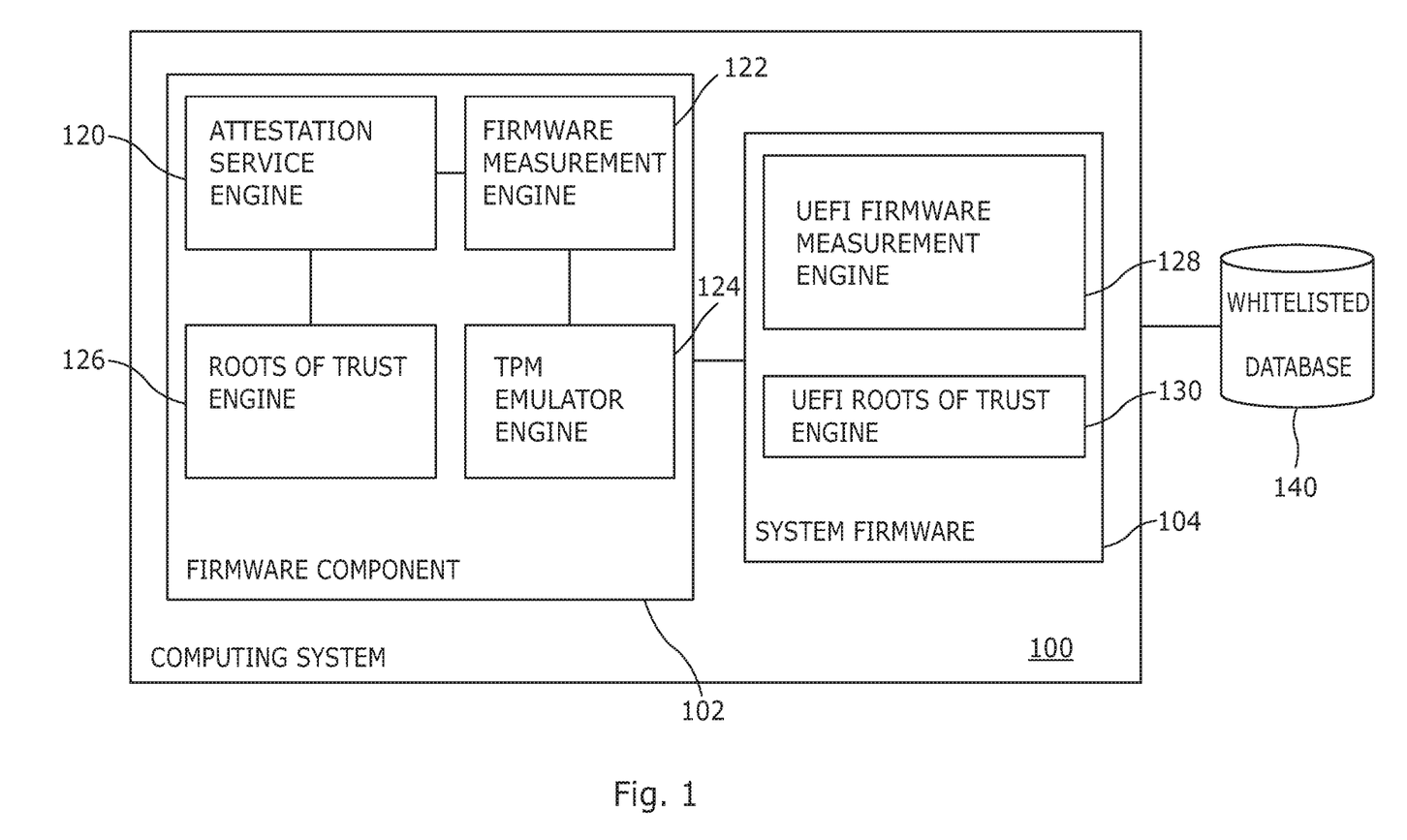
FIG. 1 is a block diagram of an example computing environment for performing an action based on a pre-boot measurement of a firmware image.

FIG. 1 is a block diagram of an example computing system 100 for performing an action based on a pre-boot measurement of a firmware image.

In an example, computing system may represent any type of computing device capable of reading machine-executable instructions. Examples of the computing device may include, without limitation, a server, a desktop computer, a notebook computer, a tablet computer, a thin client, a mobile device, a personal digital assistant (PDA), and the like.

As used herein, the term "server" may include a computer and/or a computer program (machine-readable instructions) that may process requests from other (client) computers over a network.

In the example of FIG. 1, computing system 100 may include a firmware component 102. Although, one firmware component is shown in FIG. 1, other examples of this disclosure may include more than one firmware component. As used herein, the term "firmware component" may refer to a hardware component that comprises firmware other than a Basic Input/Output System (BIOS) firmware. For example, in the context of FIG. 1, a firmware component may refer to a hardware component that comprises firmware other than BIOS (or "system firmware") of computing system 100. Some non-limiting examples of firmware component 102 may include a management processor, an input/output (I/O) component, a power supply component, and a complex programmable logic device (CPLD). As used herein, the term "management processor" may include a remote server management processor embedded on system 100 that allows management (for example, monitoring and controlling) of system 100 from a remote location.

In an example, computing system 100 may be coupled to a cloud computing environment (or "cloud"). In an example, the cloud computing environment may include processing components, network components, and/or storage components, which may be referred to as cloud resources. The cloud computing environment may represent a public cloud, a private cloud, a community cloud, or a hybrid cloud. The cloud computing environment may be used to provide or deploy various types of cloud services. These may include Infrastructure as a Service (IaaS), Platform as a Service (PaaS), Software as a Service (SaaS), and so forth. In an example, the cloud computing environment may include a cloud platform. As used herein, a "cloud platform" may refer to a tool (software and/or hardware) which may be used to manage resources in the cloud computing environment. A non-limiting example of the cloud platform may include the OpenStack platform.

Computing system 100 may be in communication with the cloud computing environment, for example, via a computer network. In an instance, the network may be a Local Area Network (LAN), a Wireless Local Area Network (WLAN), a Metropolitan Area Network (MAN), a public network (for example, the Internet) or a private network (for example, an intranet).

In an example, firmware component 102 in computing system 100 may include an attestation service engine 120, a firmware measurement engine 122, a Trusted Platform Module (TPM) emulator engine 124, a roots of trust engine 126, a Unified Extensible Firmware Interface (UEFI) measurement engine 128, and a UEFI roots of trust engine 130.

Engines 120, 122, 124, 126, 128, and 130 may include any combination of hardware and programming to implement the functionalities of the engines described herein, but at least include hardware that is configured to perform the functionalities. In examples described herein, such combinations of hardware and software may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of the computing system 100. In some examples, the at least one machine-readable storage medium may store instructions that, when executed by the at least one processing resource, at least partially implement some or all engines of computing system 100. In such examples, computing system 100 may include the at least one machine-readable storage medium storing the instructions and the at least one processing resource to execute the instructions.

In an example, attestation service engine 120 in firmware component 102 may be used to attest a firmware image. In an example, the firmware image may include a firmware image of firmware component. In another example, the firmware image may include a firmware image of a second firmware component in system 100. Some non-limiting examples of the second firmware component may include an input/output (I/O) component, a power supply component, and a complex programmable logic device (CPLD). In another example, the firmware image may include a firmware image of system firmware of system 100.

As used herein, the term "attest" (or "attestation") may refer to the process of verifying the trustworthiness of a description of a firmware image. In an example, the description of a firmware image may include a version (for example, a version number) of the firmware image. In an example, attestation service engine 120 may receive a request from a platform to attest a firmware image of firmware component 102. Some non-limiting examples of the platform may include a server, a desktop computer, a notebook computer, a tablet computer, a thin client, a mobile device, a personal digital assistant (PDA), and an operating system. In an example, the platform may be a part of the cloud computing environment described earlier. In an example, attestation service engine 120 may provide the request to firmware measurement engine 122.

In an example, if the request relates to an attestation of the firmware image of firmware component 102, firmware measurement engine 122 may access the firmware image of firmware component 102, and share the firmware image of firmware component 102 with TPM emulator engine 124. In another example, if the request relates to an attestation of a second firmware component in system 100, firmware measurement engine 122 may access the firmware image of the second firmware component, and share the firmware image of the second firmware component with TPM emulator engine 124. In an example, if the request relates to an attestation of a system firmware image of system 100, firmware measurement engine 122 may access the system firmware image, and share the system firmware image with TPM emulator engine 124.

TPM emulator engine 124 may emulate a function(s) of a hardware-based Trusted Platform Module (TPM). A hardware-based TPM may include a tamper-resistant integrated circuit built into a motherboard of a system that may perform cryptographic operations (for example, key generation), and may include artifacts that may be used to authenticate a firmware component. These artifacts may include, for example, certificates, passwords and encryption keys. In an example, the TPM emulator engine 124 may emulate services of a hardware-based TPM based on a standard specification, such as the specification published by the Trusted Computing Group (for example, TPM 1.2 or TPM 2.0 specification). These services may relate to, for example, device identification, authentication, encryption, measurement, device integrity, secure generation of cryptographic keys, remote attestation and sealed storage In an example, in response to receiving a firmware image from firmware measurement engine 122, TPM emulator engine 124 may determine a measurement of the firmware image. As used herein, the term "measurement" may refer to a hash of a firmware image. In an example, a measurement of the firmware image may be generated using a cryptographic hash function, for example, Secure Hash Algorithms (SHAs). Example SHAs that may be used include SHA-2 and SHA-512. In an example, the measurement may be performed by TPM emulator engine 124, beginning from a hardware root of trust boot block.

In an example, TPM emulator engine 124 may determine a measurement of the firmware image by generating a hash of the firmware image. In an example, the hash of the firmware image may be stored in a shielded storage location within TPM emulator engine 124. In an example, the storage location may include a virtual Platform Configuration Register (PCR). The PCR may include a 256 bit storage location. The PCR may be of the same length as an SHA-2 digest. The PCR may store a measurement result. Multiple virtual PCRs may be present in TPM emulator engine 124 to store and/or report measurements of various firmware images that may be presented to TPM emulator engine 124 by firmware measurement engine 122. In another example, the hash of the firmware image may be stored in a secure storage device, for example, a NAND flash memory and a NVRAM partition.

In an example, if a firmware image is not accessible to firmware measurement engine 122, UEFI firmware measurement engine 128 may be used to read a directly accessible firmware image (e.g. GPU firmware and other auxiliary firmware images). UEFI is a specification that defines a software interface between an operating system and platform firmware. A UEFI framework may include modules, such as drivers, protocols, and applications. A UEFI-based implementation may allow execution of pre-operating system agents, such as driver, OS loader, and application. A UEFI TPM emulator engine (not shown) may be used to determine a measurement of such an image. In an example, the UEFI TPM emulator engine may be run in a sandbox environment. The measurement may be provided to the attestation service engine using a secure in-band interface. In an example, the secure in-band interface may include a physical channel between firmware component 102 and system firmware 104 that is authenticated and encrypted. The physical channel may include, for example, a PCI bus. The commands sent over the bus may be encrypted after authentication. In an example, the secure in-band interface may include a shared memory that is accessible to firmware component 102 and system firmware 104. The shared memory may be disabled after booting with one time write access protection.

Roots of trust engine 126 may include a set of functions that is inherently trusted by a platform. These functions may include, for example, functions performed by a Roots of trust for Measurement (RTM), a Roots of trust for Storage (RTS) and a Roots of trust for Reporting (RTR), as elaborated below. For example, these functions may relate to a secure boot, a secure access, a secure identification, a secure authentication, and firmware integrity assurance. The "inherent trust" is based on the premise that these functions are secure from any alteration, for example, by malware. In an example, these functions may be trusted by an operating system (OS) on computing system 100. Roots of trust engine 126 may be entrusted with reliably measuring integrity events, i.e. events that alter the trusted state of a platform. In an example, the roots of trust engine 126 may include a hardware-validated boot process to ensure firmware component 102 may only be started using code from an immutable source.

In an example, roots of trust engine 126 may include a root certificate, which may be a public key certificate that identifies a root certificate authority (CA). Roots of trust engine 126 may determine that the initial code is what the manufacturer intended, before execution. After validating itself, roots of trust engine 126 may validate the first piece of code in the chain of trust.

A hardware-based roots of trust engine 126 may protect firmware component's unique key, and the keys that may be derived from it. Roots of trust engine 126 may provide a secure storage, and act as an authentication device. In an example, root of storage engine 126 may be embedded in firmware component 102.

In an example, roots of trust engine 126 may be based on a standard specification, such as the specification published by the Trusted Computing Group (for example, TPM 1.2 or TPM 2.0 specification). In an example, the roots of trust engine 126 may include three distinct roots of trust: a Roots of trust for Measurement (RTM), a Roots of trust for Storage (RTS) and a Roots of trust for Reporting (RTR). The Roots of trust for Storage may be a trusted entity that provides confidentiality and integrity protection for stored information without interference leakage. Roots of trust for Reporting may be used to report to external parties, information about the platform state accurately and correctly. The Roots of trust for Measurement may be used to generate integrity measurements for the processes that are running on firmware component 102. In an example, attestation service engine may maintain a list of all measurements committed to the virtual PCRs, and sign them with a private key known only to the roots of trust engine 126.

In an example, a pre-determined measurement of a firmware image may be stored in a whitelisted database 140. As used herein, the pre-determined measurement of a firmware image may include a reference measurement(s) of the firmware image. In an example, a pre-determined measurement of a firmware image may be referred to as a "golden" measurement. In an example, a pre-determined measurement of a firmware image may be provided by the original equipment manufacturer (OEM). In an example, whitelisted database 140 may present within system 100. In another example, whitelisted database 140 may present external to system 100, for example, in the cloud computing environment described earlier.

In an example, attestation service engine 126 may receive or retrieve a measurement of a firmware image from a virtual PCR in TPM emulator engine. Attestation service engine 126 may retrieve a pre-determined measurement of the firmware image from whitelisted database 140. Attestation service engine 126 may compare the measurement of the firmware image with the pre-determined measurement of the firmware image. In an example, the comparison may be performed prior to booting of system 100. In response to a determination by attestation service engine that the measurement of the firmware image matches with the pre-determined measurement of the firmware image, system 100 may be allowed to boot. In response to a determination by attestation service engine 126 that the measurement of the firmware image is different from the pre-determined measurement of the firmware image, attestation service engine 126 may perform an action. In an example, the action may relate to firmware component 102, system 100, and/or the firmware image. In an example, the action may be defined in a user-defined policy. For example, a user-defined policy may specify disabling power on system 100 and booting to UEFI/OS if the measurement and the pre-determined measurement of the firmware image do not match. In another example, a user-defined policy may specify disabling an I/O card on system if the measurement and the pre-determined measurement of the firmware image for the I/O card do not match. In another example, a user-defined policy may specify auto-recovery of the firmware image to a known good version if the measurement and the pre-determined measurement of the firmware image do not match.

In an example, attestation service engine 126 may provide an out-of-band HTTPS RESTFul interface for authenticated users to retrieve the measurements. Attestation service engine 126 may also be configured to send signed alert messages asynchronously after the measurement process, which in turn may be used to verify the compliance of system 100.

In an example, system 100 may include a separate TPM. As mentioned earlier, in an example, the TPM may include a tamper-resistant integrated circuit built into a motherboard of system 100 that may perform cryptographic operations. UEFI firmware measurement engine 128 along with UEFI roots of trust 130 may securely read a firmware image of firmware component 102 and take measurements of the firmware image in an early phase of booting of system. In another example to speed up boot time, UEFI firmware measurement engine may read a measured hash of the booted firmware image, which may be computed during a verified boot of the firmware image with roots of trust engine 126 from either a secure storage accessible to UEFI firmware measurement engine or using secure in band commands. UEFI based firmware image measurements may extend measurements by using existing or unused PCRs in the TPM. In an example, UEFI firmware measurement engine 128 may share measurements with attestation service engine.

Figure 2:
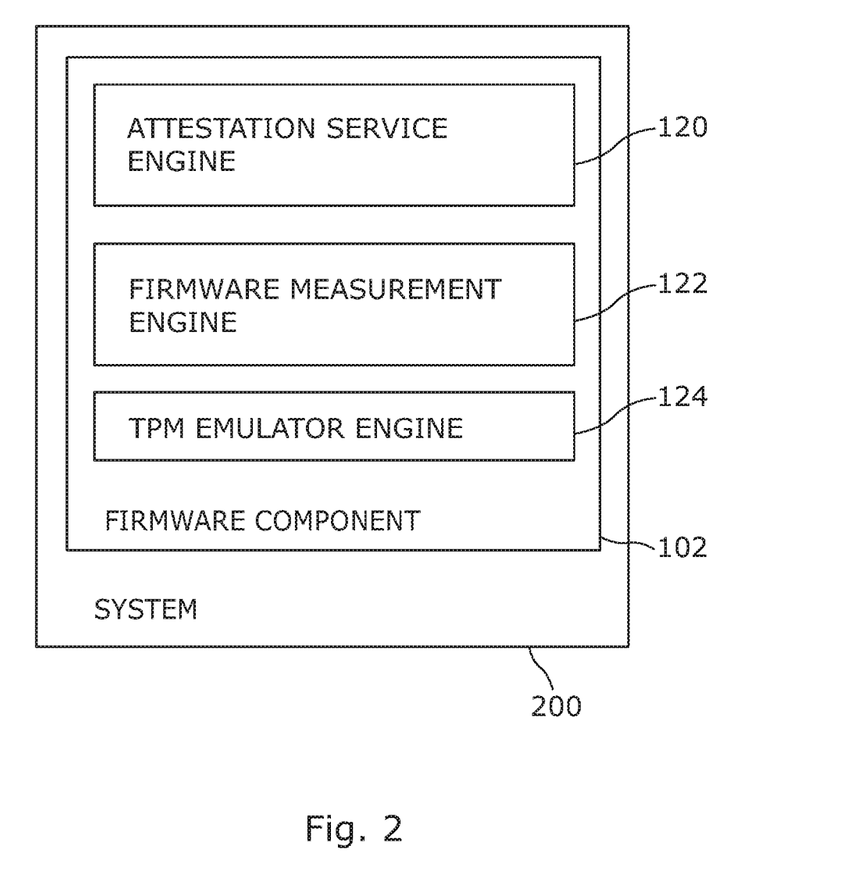
FIG. 2 is a block diagram of an example system for performing an action based on a pre-boot measurement of a firmware image.

FIG. 2 is a block diagram of an example system 200 for performing an action based on a pre-boot measurement of a firmware image. In an example, system 200 may be implemented by any suitable device, as described herein in relation to computing system 100 of FIG. 1, for example. For the sake of brevity, components or reference numerals of FIG. 2 having a same or similarly described function in FIG. 1 are not being described in detail in connection with FIG. 2. Said components or reference numerals may be considered alike.

In an example, firmware component 102 in system 200 may include an attestation service engine 120, a firmware measurement engine 122, a Trusted Platform Module (TPM) emulator engine 124, a roots of trust engine 126, a Unified Extensible Firmware Interface (UEFI) measurement engine 128, and a UEFI roots of trust engine 130.

In an example, firmware measurement engine 122 may access a firmware image. TPM emulator engine 124 may determine a measurement of the firmware image prior to booting of system 200. In an example, the measurement may be performed, beginning from a hardware root of trust boot block.

TPM emulator engine 124 may store the measurement of the firmware image in a virtual Platform Configuration Register (PCR). Attestation service engine 120 may retrieve a pre-determined measurement of the firmware image from a whitelisted database. Attestation service engine 120 may compare the measurement of the firmware image with the pre-determined measurement of the firmware image prior to booting of the system. Attestation service engine 120 may perform an action, in response to a determination that the measurement of the firmware image is different from the pre-determined measurement of the firmware image.

Figure 3:
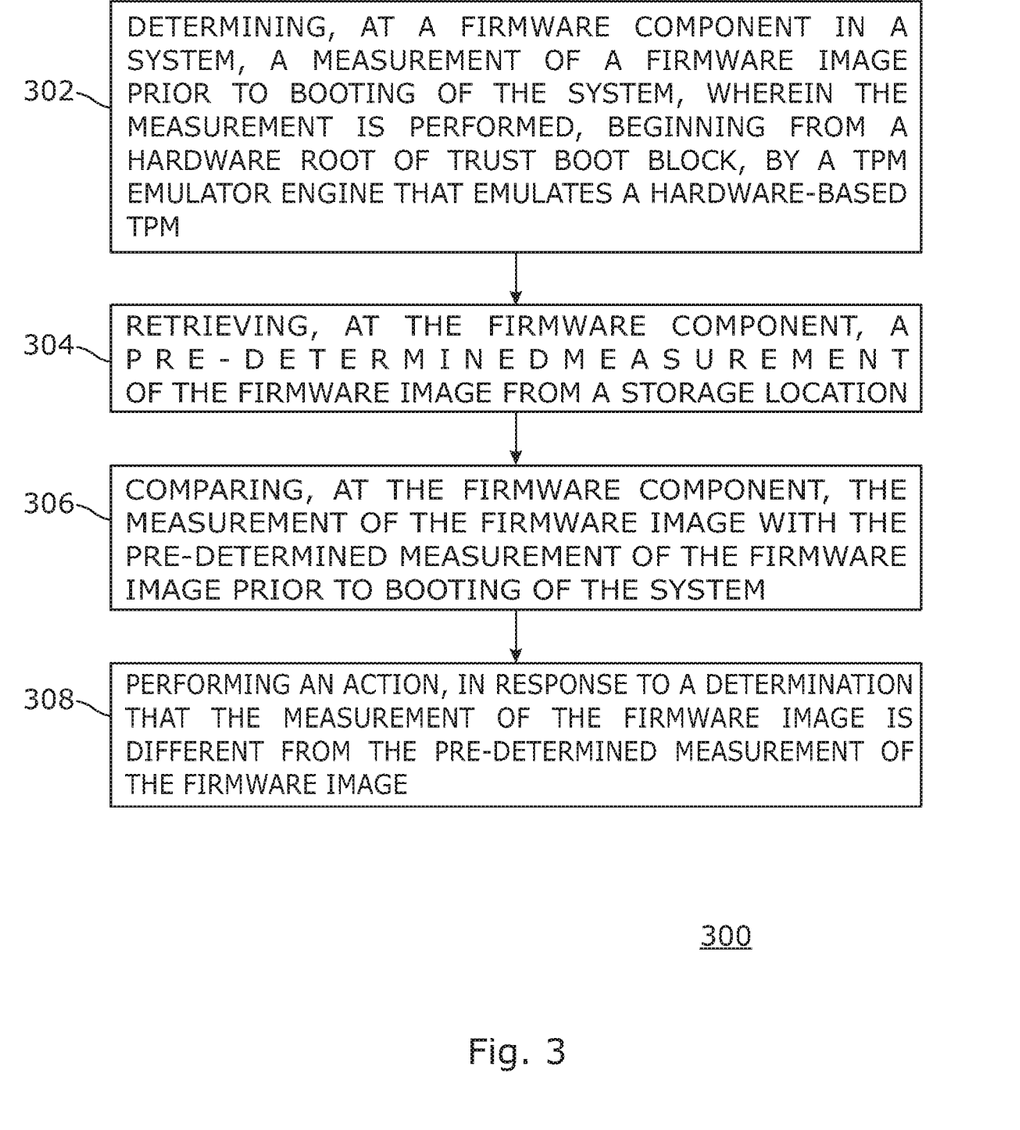
FIG. 3 is a block diagram of an example method of performing an action based on a pre-boot measurement of a firmware image.

FIG. 3 is a block diagram of an example method 300 for performing an action based on a pre-boot measurement of a firmware image. The method 300, which is described below, may be partially executed on a system such as computing system 100 of FIG. 1, or system 200 of FIG. 2. However, other suitable computing devices may execute method 300 as well. At block 302, at a firmware component in a system, a measurement of a firmware image may be determined prior to booting of the system. In an example, the measurement may be performed, beginning from a hardware root of trust boot block, by TPM emulator engine 124. At block 304, at the firmware component, a pre-determined measurement of the firmware image may be retrieved from a storage location within the system. At block 306, the measurement of the firmware image may be compared with the pre-determined measurement of the firmware image prior to booting of the system. At block 308, in response to a determination that the measurement of the firmware image is different from the pre-determined measurement of the firmware image, an action may be performed. In an example, aforementioned parts of method 300 may be performed when system 200 is running on auxiliary power.

Figure 4:
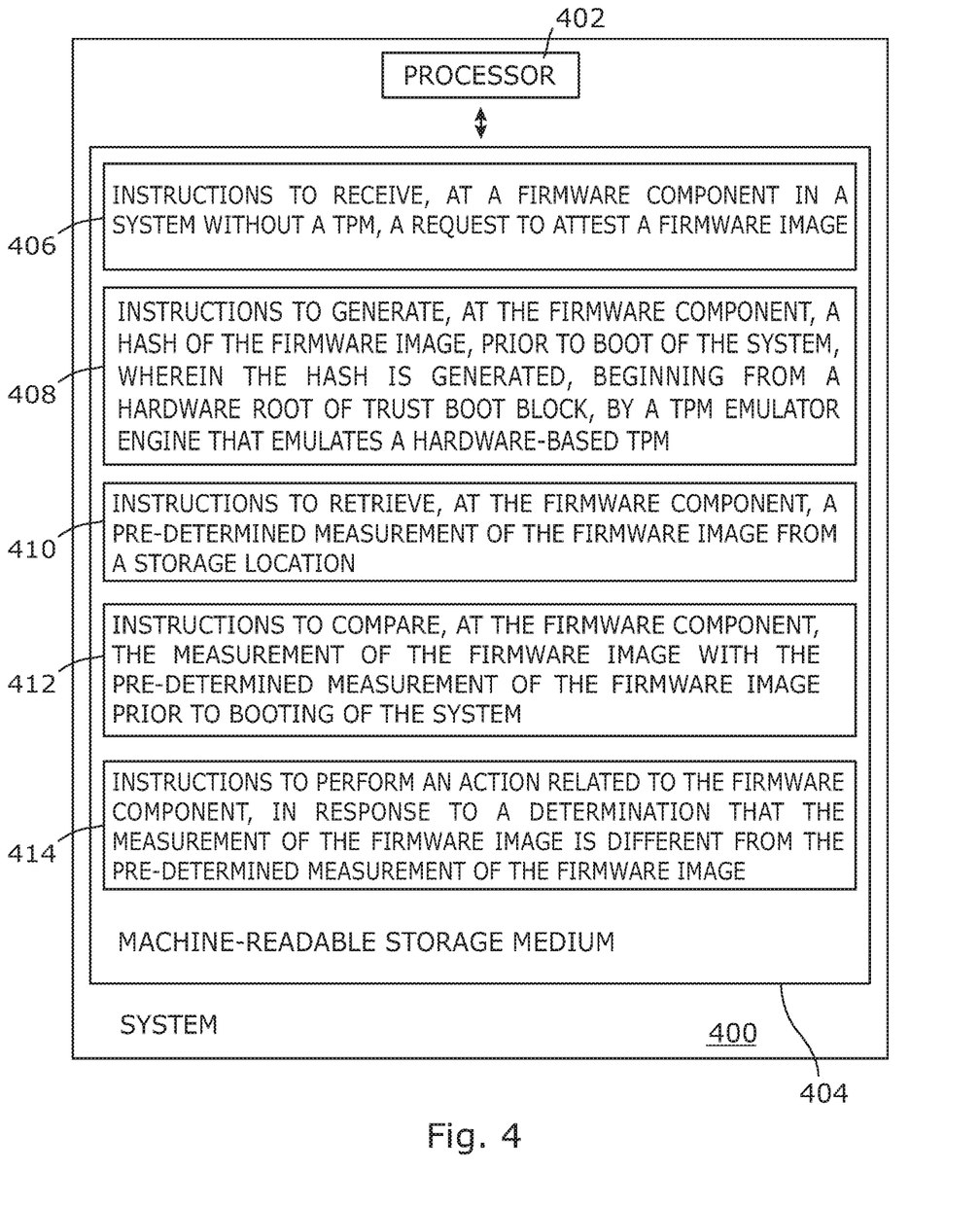
FIG. 4 is a block diagram of an example system including instructions in a machine-readable storage medium for performing an action based on a pre-boot measurement of a firmware image.

FIG. 4 is a block diagram of an example system 400 including instructions in a machine-readable storage medium for performing an action based on a pre-boot measurement of a firmware image. System 400 includes a processor 402 and a machine-readable storage medium 404 communicatively coupled through a system bus. In an example, system 400 may be analogous to computing system 100 of FIG. 1, or system 200 of FIG. 2. Processor 402 may be any type of Central Processing Unit (CPU), microprocessor, or processing logic that interprets and executes machine-readable instructions stored in machine-readable storage medium 404. Machine-readable storage medium 404 may be a random access memory (RAM) or another type of dynamic storage device that may store information and machine-readable instructions that may be executed by processor 402. For example, machine-readable storage medium 404 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium.

Machine-readable storage medium 404 may store instructions 406, 408, 410, 412, and 414. In an example, instructions 406 may be executed by processor 402 to receive, at a firmware component in a system without a hardware-based Trusted Platform Module (TPM), a request to attest a firmware image. Instructions 408 may be executed by processor 402 to generate, at the firmware component, a hash of the firmware image prior to booting of the system. In an example, the hash may be generated, beginning from a hardware root of trust boot block, by TPM emulator engine 124. Instructions 410 may be executed by processor 402 to retrieve, at the firmware component, a pre-determined measurement of the firmware image from a storage location external to the system. Instructions 412 may be executed by processor 402 to compare, at the firmware component, the measurement of the firmware image with the pre-determined measurement of the firmware image prior to booting of the system. Instructions 414 may be executed by processor 402 to perform an action, in response to a determination that the measurement of the firmware image is different from the pre-determined measurement of the firmware image.

In an example, instructions to determine the measurement of the firmware image may comprise instructions to determine the measurement of the firmware image beginning from a hardware root of trust boot block, and continue the measurement along a chain of trust based on the hardware root of trust during booting of the system. In an example, machine-readable storage medium 404 may store instructions to allow boot of system 400, in response to a determination that the measurement of the firmware image is not different from the pre-determined measurement of the firmware image.

For the purpose of simplicity of explanation, the example method of FIG. 3 is shown as executing serially, however it is to be understood and appreciated that the present and other examples are not limited by the illustrated order. The example systems of FIGS. 1, 2, and 4, and method of FIG. 3 may be implemented in the form of a computer program product including computer-executable instructions, such as program code, which may be run on any suitable computing device in conjunction with a suitable operating system (for example, Microsoft Windows, Linux, UNIX, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration only. Although the solution has been described in conjunction with a specific example thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The invention claimed is:

1. A method comprising:
determining, at a firmware component in a system, a measurement of a firmware image prior to booting of the system, wherein the measurement is performed, beginning from a hardware root of trust boot block, by a Trusted Platform Module (TPM) emulator engine that emulates a hardware-based TPM, wherein determining the measurement of the firmware image prior to booting of the system includes a remote server management processor executing instructions to form the TPM emulator engine;
retrieving, at the firmware component, a pre-determined measurement of the firmware image from a storage location;
comparing, at the firmware component, the measurement of the firmware image with the pre-determined measurement of the firmware image prior to booting of the system; and
using the TPM emulator engine to continue the measurement along a chain of trust based on the hardware root of trust boot block during boot of the system.

2. The method of claim 1, storing the measurement of the firmware image in a virtual Platform Configuration Register (PCR) in the firmware component.

3. The method of claim 1, wherein determining the measurement of the firmware image comprises generating a hash of the firmware image.

4. The method of claim 1, wherein the system is running on auxiliary power.

5. The method of claim 1, wherein the system is without the hardware-based TPM.

6. A system comprising:
a processor; and
a memory to store firmware instructions that, when executed by the processor, cause the processor to:
emulate a Trusted Platform Module (TPM), wherein emulating the TPM comprises determining a measurement of the firmware image beginning from a hardware root of trust boot block prior to booting of the system, storing the measurement of the firmware image in a virtual Platform Configuration Register (PCR), and continuing the measurement along a chain of trust based on the hardware root of trust boot block during boot of the system;
retrieve a pre-determined measurement of the firmware image from a whitelisted database;
compare the measurement of the firmware image with the pre-determined measurement of the firmware image prior to booting of the system; and
perform an action, in response to a determination that the measurement of the firmware image is different from the pre-determined measurement of the firmware image.

7. The system of claim 6, further comprising a remote server management processor that allows management of the system from a remote location.

8. The system of claim 6, wherein the measurement includes a hash of the firmware image.

9. The system of claim 6, wherein the firmware instructions, when executed by the processor, cause the processor to emulate a service provided by a hardware-based TPM.

10. The system of claim 6, further comprising one of an input/output (I/O) component, a complex programmable logic device (CPLD), and a power supply component.

11. The system of claim 6, wherein the action includes disabling the firmware component.

12. A non-transitory machine-readable storage medium comprising instructions, the instructions executable by a processor to:
receive, at a firmware component in a system without a hardware-based Trusted Platform Module (TPM), a request to attest a firmware image;
generate, at the firmware component, a hash of the firmware image, prior to boot of the system, wherein the hash is generated, beginning from a hardware root of trust boot block, by a TPM emulator engine that emulates a hardware-based TPM;
retrieve, at the firmware component, a pre-determined measurement of the firmware image from a storage location external to the system;
compare, at the firmware component, the measurement of the firmware image with the pre-determined measurement of the firmware image prior to boot of the system;
perform an action, in response to a determination that the measurement of the firmware image is different from the pre-determined measurement of the firmware image; and
continue the measurement along a chain of trust based on the hardware root of trust boot block during boot of the system.

13. The storage medium of claim 12, wherein the processor comprises a remote server management processor.

14. The storage medium of claim 12, wherein the firmware image includes a firmware image of a second firmware component in the system.

15. The storage medium of claim 12, wherein the action is defined in a user-defined policy.

16. The storage medium of claim 12, wherein the firmware image includes a firmware image of system firmware of the system.

17. The storage medium of claim 12, wherein the action includes disabling a power supply to the system.

18. The storage medium of claim 12, further comprising instructions to allow boot of the system, in response to a determination that the measurement of the firmware image is not different from the pre-determined measurement of the firmware image.

* * * * *